Nov. 3, 1936.          H. E. KENNEDY          2,059,243
IGNITION SYSTEM FOR INTERNAL COMBUSTION ENGINES
Filed July 25, 1934
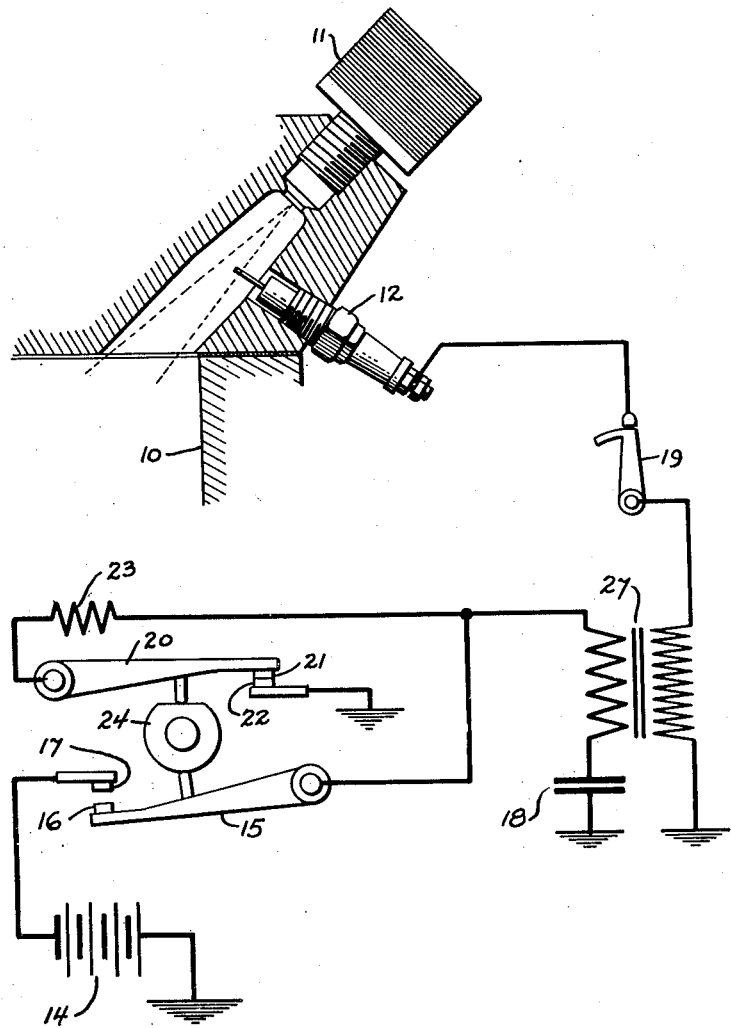
INVENTOR.
Harry E. Kennedy.
BY
Townsend and Loftus.
ATTORNEYS.

Patented Nov. 3, 1936

2,059,243

UNITED STATES PATENT OFFICE 2,059,243

IGNITION SYSTEM FOR INTERNAL COMBUSTION ENGINES

Harry E. Kennedy, Berkeley, Calif.

Application July 25, 1934, Serial No. 736,865

6 Claims. (Cl. 123—148)

This invention relates to internal combustion engines and particularly pertains to an ignition system for engines operated by the method of combustion disclosed in Letters Patent of the United States #1,903,381 issued to me April 4, 1933.

In this prior patent I have disclosed a method of combustion for starting and operating internal combustion engines wherein the most efficient compression pressures may be employed. In this method of combustion the intake air remains unthrottled throughout the entire speed range and unvaporized fuel is injected into the combustion chamber by what is commonly termed solid or airless injection. For ignition purposes a high tension arc is created in proximity to the path of fuel, which arc is of an intensity and duration that its electrical and thermal influence is sufficient to dissociate the reacting substances of the air and fuel in the combustion chamber to an extent sufficient to properly initiate combustion. I have pointed out in my prior patent that the combustion so initiated has the same characteristics irrespective of compression pressures within a wide range. I have also found that with ignition so initiated that if the direction of the fuel spray is proper relative to the direction of air flow and injection has the proper characteristics that highly efficient combustion results. Also, that the ignition lag is negligible and unaffected to any degree either by the compression pressure or the ratio of fuel to air in the charge so that the motor will have flexibility and speed range comparing favorably with engines operating on highly volatile fuels.

In my prior patent above-identified I have disclosed the arc created by means of an ignition system which includes an alternator driven by the engine and a suitable transformer by which an arc of suitable characteristics may be produced at the gap of the spark plug. I desire, however, to point out here that none of the known ignition systems heretofore employed in connection with internal combustion engines (other than that disclosed in my prior patent above-identified) is capable of producing an arc of suitable characteristics to accomplish the result above set out throughout a wide range of engine speeds. Of these known ignition systems only two were widely used for producing high tension discharges sufficient for ignition of volatile fuels in proper mixture ratios. The first of these systems is generally known as the battery type system, the elements and circuit of which are too well known to require detailed description. In this system, when the contact closes the primary circuit, the current will build up logarithmically at a rate depending upon the inductance and resistance of that circuit until the current has reached a final steady value dictated by Ohm's law. There is, therefore, an electromotive force generated in the secondary winding during the period wherein the current is changing or building up. No current flows as a result of this electromotive force for the reason that the resistance of the spark gap is too high for this relatively small voltage to jump. When, however, the circuit is interrupted, the flux linking the primary and secondary collapses with great rapidity so that a high voltage is induced in the secondary winding and the current flow in the secondary takes place.

It, therefore, will be readily seen that there is only one instant that the primary circuit may be broken wherein the maximum energy may be developed in the secondary without a useless expenditure of energy in the primary. This instant is, of course, when the primary circuit just attains its maximum value and any delay beyond this point involves heating losses within the coil which are not recoverable in the spark. Should the circuit be interrupted before the current has reached its maximum, the total flux which will collapse will be correspondingly less so that proportionately less current will be developed within the secondary. Therefore, the spark intensity will continuously diminish as higher engine speeds are attained since the duration of the closing periods progressively diminish with speed. Consequently, such a system is entirely unsuitable for producing an arc of suitable characteristics to initiate combustion through a wide range of engine speeds in the method of combustion such as pointed out in my prior patent above referred to.

The second commonly used type of ignition for internal combustion engines is the well known magneto system of ignition. In this system the shortcoming of the battery type system at increasingly higher engine speeds is overcome because in this system the primary is supplied with a voltage varying as a function of engine speed. The principal shortcoming of the magneto system however, is at the lower engine speeds because when the engine speed is low, the rate of rotation of the armature of the magneto is too slow to generate sufficient voltage to produce the proper arc in the lower speed ranges. To overcome this latter shortcoming, it is common practice to employ auxiliary devices either to increase the velocity of the armature during a part of its rotation at slow speed or to supplement the magneto system with a battery system at low speeds. A second disadvantage of employing a magneto system is that it is impractical to advance and retard the time of spark and at the same time maintain the maximum spark intensity constant.

I desire to point out that in both the battery system and the magneto system the total energy which may be liberated in the secondary is dependent upon the capacity of the breaker points to rupture the primary. If the magneto or battery systems such as just described could be employed to create a high tension arc sufficient to initiate combustion in the method of combustion disclosed by me in the prior patent above referred to, the contacts in the circuits would rapidly deteriorate, rendering the systems impractical for commercial purposes.

It is the principal object of my present invention to provide a very simple and efficient ignition system for internal combustion engines operated by the method of combustion disclosed in my prior Letters Patent of the United States hereinbefore identified, which ignition system is capable of efficiently producing an electrical arc of constant predetermined energy and duration throughout a wide range of engine speeds, and enables advancing and retarding the timing of such arc relative to the piston operation of the engine without affecting the energy or duration of the arc.

The invention is exemplified in the following description and illustrated by way of example in the accompanying drawing, in which:

The figure is a diagrammatic view of the ignition system embodying the preferred form of my invention.

Referring more particularly to the accompanying drawing, 10 indicates the cylinder of an internal combustion engine fitted with an injection valve 11 by means of which proper charges of fuel may be injected by what is termed "solid" or "airless" injection into the combustion chamber of the cylinder 10 at properly timed intervals with relation to the piston strokes. Fitted to the combustion chamber and with its terminals positioned so that the arc will intersect the path of the fuel spray is a spark plug 12 of more or less conventional design. It is my purpose to create at the terminals of the spark plug 12 a high tension arc having suitable electrical and thermal characteristics to dissociate the reacting substances of the air and fuel in the combustion chamber to an extent sufficient to initiate combustion. Of course, the arc is created in timed relation to the commencement and termination of injection.

In the present instance I create the arc in a manner so that its duration is constant throughout the entire speed range of the engine (which may be a wide speed range) and so that the quantity of electricity discharged at the gap will be constant throughout the entire speed range of the engine.

To accomplish this, I provide electrical circuits for creating such an arc at the terminals of the spark plug. These circuits can be readily understood from the drawing where it will be seen that I have provided a source of electromotive force 14 which I prefer to be a storage battery of twenty-four volts. One side of this battery is led to ground, the other side being connected to a breaker arm 15 having a contact point 16 adapted to contact with a stationary contact point 17. This latter is electrically connected by means of a low tension circuit with one side of the primary winding of a transformer 27. The other side of the primary of the transformer 27 is connected to a condenser 18 in turn connected with the ground. The primary of the step-up transformer 27 is also connected with a breaker arm 20 having a contact point 21 for contact with a stationary contact point 22 which is connected to the ground through the medium of a resistance 23, this resistance being interposed for the purpose of balancing the circuits. The secondary of the transformer 27 is connected by a high tension circuit through a distributor 19 to the spark plug, the distributor 19 being illustrated merely to illustrate the manner in which the ignition system is applied to multi-cylinder engines, no current being, of course, broken by the distributor 19.

In operation, assuming that the contact points 16 and 17 are in contact, a quantity of electricity will flow through the low tension circuit from the battery 14 through the contacts 16 and 17 through the primary of the step-up transformer 27 to the condenser 18. The quantity of electricity will be determined by the capacity of the condenser 18 and the electromotive force of the battery 14. At the first rush of current through the primary of the step-up transformer 27, the flux therein is changing most rapidly and consequently sufficient electromotive force is induced in the secondary of the transformer and high tension circuit to jump the gap between the terminals of the spark plug 12, which gap immediately becomes ionized. The secondary current will continue to flow through the high tension circuit during the entire time interval that current is flowing in the primary winding of the transformer 27. However, as the condenser 18 becomes charged, countervoltage builds up and when it equals that of the electromotive force, the primary current will cease to flow and the flow through the high tension circuit cease to end the discharge at the spark gap.

Thereafter the points 16 and 17 are opened and the points 21 and 22 contact, discharging the condenser 18 through the primary winding of the step-up transformer 27 through the breaker arm 20, points 21 and 22 and to the ground through the resistance 23. This will induce sufficient electromotive force in the secondary winding of the transformer 27 to create the desired arc at the gap between the terminals of the spark plug 12. The secondary current and the arc will endure during the entire time interval necessary to fully discharge the condenser.

For operating the contact points 16 and 17 and 21 and 22, I have provided a cam 24 which is engine driven and which will open and close the points referred to in properly timed relation to the crankshaft operation of the engine. The timing of the cam 24 may be advanced and retarded automatically by an automatic type of governor as in the conventional ignition system. It can be readily seen that such advancing or retarding unaffects the energy or duration of the arc.

It can be readily seen from the previous description and from the diagram that when the charging contactors 16 and 17 are closed, the discharging contactors 21 and 22 are open, and that when the latter are closed, the contacts 16 and 17 are open, there being a brief interval when both sets of contactors are open to avoid a short circuit.

It is deemed advisable to point out here that in my system, unlike the conventional systems, the high tension discharge at the spark gap commences when the contacts close and endures until the condenser 18 has been either fully charged or fully discharged. It will be observed that in this manner my system produces twice as many high tension discharges at the spark gap per cam lobe as do the conventional systems.

One of the most important features of my present system is that the quantity of electricity discharged at the gap to produce the high tension arc is constant regardless of engine speed throughout a wide speed range. Likewise, the duration of the arc at the gap will be constant regardless of engine speed throughout a wide range of speed. It should be pointed out that I prefer the duration of the arc be much longer than the conventional jump spark induced by rupturing the primary of the conventional battery system.

It will be noted that in the system here disclosed, the sets of contacts 16 and 17 and 21 and 22 do not break current at all because when the contacts 16 and 17 close, the current commences flowing and is reduced to zero by the building up of a countervoltage in the condenser, after which time the contacts 16 and 17 are opened. When the contacts 21 and 22 are closed to discharge the condenser and produce another high tension discharge at the gap, they remain in contact until the current reaches zero by the condenser being fully discharged. It is therefore very apparent that no current is broken by the contacts and the same will afford long and satisfactory services regardless of the intensity of the current in the high tension circuit.

The high tension arc which my system produces at the terminals of the spark plug, as previously pointed out, has sufficient electrical and thermal influence to effect ionization and dissociate the reacting substances of the air and fuel in the combustion chamber to an extent sufficient to initiate combustion in a method of combustion wherein the cylinder is substantially fully charged with air during the intake stroke of the piston in the cylinder and unvaporized fuel is injected into the cylinder in properly timed relation to the crankshaft operation of the engine.

The cam 24 is so timed that the high tension arcs will be created at the terminals of the spark plug in properly timed relation to injection and consequently in properly timed relation to the engine crankshaft operation.

In practice I prefer to employ a condenser 18 of approximately 2000 microfarads and with the battery 14 of twenty-four volts. The transformer 27 may be either of the closed or open core type and properly adjusted in its characteristics to the other elements of the circuit. In practice I employ a transformer having a primary consisting of approximately eighty turns wound on a core of approximately one square inch with a secondary consisting of 40,000 turns.

The ignition system which I have here disclosed will produce sufficient voltage and electrical energy at the gap to ignite a fuel jet in an internal combustion engine with a compression pressure of 200 pounds and with a spark gap set at fifty thousandths of an inch wide.

It is desired to point out that with my present ignition system that even though the main ignition switch is left closed, the energy of the battery will not be dissipated, due to the fact that the current will flow from the battery only until the condenser becomes charged and its countervoltage equals that of the battery. When this occurs, there will be no further flow of current from the battery.

From the foregoing it is obvious that I have provided a very simple ignition system which may be economically manufactured and assembled on an internal combustion engine and which will produce a high tension, high current arc of a constant predetermined magnitude throughout a wide range of engine speeds, which arc will be of a constant and predetermined duration throughout a wide range of engine speeds.

Having thus described my invention, what I claim and desire to secure by Letters Patent is:

1. An ignition system for an internal combustion engine including a source of electrical energy of substantially constant potential, a condenser, a charging circuit including said source of electrical energy and said condenser, which circuit when completed enables a charging current to flow to the condenser conductively from the source of energy, which current flow results from a substantially constant potential developed by the source of energy throughout the entire completed period of said circuit, a discharging circuit not including the source of electrical energy but including said condenser and capable of discharging the said condenser when said discharge circuit is completed, engine operated dual switch means connected with both circuits to complete said charging circuit and maintain the same completed only during the open period of the discharge circuit until the condenser is charged and then opening said charging circuit, the said dual switch means completing and maintaining the discharging circuit completed only during the open period of the charging circuit for a sufficient duration to discharge the condenser, said dual switch means being operated by the engine in synchronism with the engine operation, and a high tension circuit including a spark plug inductively coupled to one of said circuits.

2. An ignition system for an internal combustion engine including a source of electrical energy of substantially constant potential, a condenser, a charging circuit including said source of electrical energy and said condenser, which circuit when completed enables a charging current to flow to the condenser conductively from the source of energy, which current flow results from a substantially constant potential developed by the source of energy throughout the entire completed period of said circuit, a discharging circuit not including the source of electrical energy but including said condenser and capable of discharging the said condenser when said discharge circuit is completed, engine operated dual switch means connected with both circuits to complete said charging circuit and maintain the same completed until the countervoltage of the condenser substantially equals that of the source of electrical energy and then opening said charging circuit, the said dual switch means completing and maintaining the discharging circuit completed only during the open period of the charging circuit for a sufficient duration to substantially fully discharge the condenser, said dual switch means being operated by the engine in synchronism with the engine operation, and a high tension circuit including a spark plug inductively coupled to one of said circuits.

3. An ignition system for an internal combustion engine including a source of electrical energy of substantially constant potential, a condenser, a charging circuit including the source of electrical energy and the condenser, which circuit when completed enables a charging current to flow to the condenser conductively from the source of energy, which current flow results from a substantially constant potential developed by the source of energy throughout the entire completed period of said circuit, a discharging circuit not including the source of electrical energy but including said condenser and capable of discharging the said condenser when said discharge circuit is completed, dual switch means connected with both circuits and engine operated to complete said charging circuit and maintain the same completed until the countervoltage of the condenser substantially equals that of the source of electrical energy and then opening said charging circuit, the said dual switch means operating to complete the discharging circuit for a sufficient duration only during the open period of the charging circuit to substantially fully discharge the condenser, said dual switch means being operated by the engine in synchronism with the engine operation, and a high tension circuit including a spark plug and inductively coupled to both of said charging and discharging circuits.

4. An ignition system for an internal combustion engine including a step-up transformer, a high tension circuit including a spark plug and the secondary winding of said transformer, a source of electrical energy of substantially constant potential, a condenser, a charging circuit including said source of electrical energy and the condenser, which circuit when completed enables a charging current flow to the condenser conductively from the source of electrical energy, which current flow results from a substantially constant potential produced by the source of energy throughout the entire completed period of said circuit, a discharging circuit not including the source of electrical energy but including said condenser and the primary winding of said transformer, engine operated dual switch means connected with both circuits and completing said charging circuit and maintaining the same closed until the countervoltage of the condenser substantially equals that of the source of electrical energy, the said dual switch means closing the discharging circuit for a sufficient duration only during the open period of the charging circuit to substantially fully discharge the condenser through the primary winding of said transformer to induce a high voltage current in the spark plug circuit and create an arc at the gap of the spark plug, the said dual switch means operating to complete and open said circuits in relatively timed relation and in synchronism with the engine operation.

5. An ignition system for an internal combustion engine including a step-up transformer, a high tension circuit including a spark plug and including the secondary winding of said transformer, a source of electrical energy of substantially constant potential, a condenser, a charging circuit including said source of electrical energy, said condenser, and the primary winding of said transformer, which circuit when completed enables a charging current flow to the condenser conductively from the source of energy to charge the condenser which current flow through the primary winding of said transformer will induce a high electromotive force in said high tension circuit and produce an arc at the gap of said spark plug, said current flow resulting from a substantially constant potential developed by the source of electrical energy throughout the entire completed period of said circuit, a discharging circuit not including the source of electrical energy but including said condenser, which discharging circuit when completed substantially fully discharges said condenser, engine operated dual switch means connected to both circuits and completing the charging circuit and maintaining the same closed so that current will flow therein until the countervoltage of the condenser substantially equals that of the source of electrical energy and then opening said circuit, the said dual switch means being operated by the engine to complete the charging circuit and maintain the same completed only during the open period of the discharging circuit and completing and maintaining the discharging circuit completed only during the open period of the charging circuit, all in synchronism with the engine operation.

6. An ignition system for an internal combustion engine including a step-up transformer, a high tension circuit including a spark plug and including the secondary winding of said transformer, a source of electrical energy of substantially constant potential, a condenser, a charging circuit including said source of electrical energy, the condenser and the primary winding of said transformer, which circuit when completed enables a charging current to flow to the condenser conductively from the source of energy to charge the condenser and create a current flow through the primary winding of said transformer to induce a current flow in the spark plug circuit to produce an arc at the gap of said spark plug, said current flow resulting from a substantially constant potential produced by the source of electrical energy throughout the entire completed period of said circuit, a discharging circuit not including the source of electrical energy but including said condenser and the primary winding of said transformer, which discharging circuit when completed discharges the condenser, said engine operated dual switch means connected with both circuits to complete charging circuit and maintain the same closed during the open period of the discharging circuit, so that the current will flow therein until the countervoltage of the condenser substantially equals that of the source of electrical energy and then opening said circuit, said dual switch means closing the discharging circuit for a sufficient duration only during the open period of the charging circuit to substantially fully discharge the condenser through the primary winding of said transformer to induce a current flow in the spark plug circuit and produce an arc at the gap of said spark plug, said dual switch means completing and opening said charging and discharging circuits in relatively timed relation and in synchronism with the engine operation.

HARRY E. KENNEDY.